US009344376B2

(12) United States Patent
Armstrong et al.

(10) Patent No.: US 9,344,376 B2
(45) Date of Patent: May 17, 2016

(54) QUALITY OF SERVICE IN MULTI-TENANT NETWORK

(71) Applicant: Lenovo Enterprise Solutions (Singapore) Pte. Ltd., Singapore (SG)

(72) Inventors: William J. Armstrong, Rochester, MN (US); Vinit Jain, Austin, TX (US); Jeffrey J. Lynch, Apex, NC (US); Nilanjan Mukherjee, Santa Clara, CA (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 190 days.

(21) Appl. No.: 14/061,586

(22) Filed: Oct. 23, 2013

(65) Prior Publication Data

US 2015/0110124 A1    Apr. 23, 2015

(51) Int. Cl.
*H04L 12/863* (2013.01)
*H04L 12/931* (2013.01)

(52) U.S. Cl.
CPC ............ *H04L 47/6215* (2013.01); *H04L 49/70* (2013.01)

(58) Field of Classification Search
CPC ....................................................... H04L 49/70
See application file for complete search history.

(56) References Cited

U.S. PATENT DOCUMENTS

| | | | |
|---|---|---|---|
| 6,594,279 B1 | 7/2003 | Nguyen et al. | |
| 8,027,354 B1* | 9/2011 | Portolani | H04L 49/70 370/395.2 |
| 2004/0081093 A1* | 4/2004 | Haddock | H04L 47/10 370/230 |
| 2007/0280245 A1 | 12/2007 | Rosberg | |
| 2009/0300209 A1* | 12/2009 | Elzur | H04L 47/10 709/234 |
| 2010/0211946 A1* | 8/2010 | Elzur | G06F 9/45537 718/1 |
| 2010/0290467 A1* | 11/2010 | Eisenhauer | H04L 12/24 370/392 |
| 2014/0003442 A1* | 1/2014 | Hernandez | H04L 12/4641 370/401 |
| 2014/0301197 A1* | 10/2014 | Birke | H04L 47/52 370/235 |
| 2015/0156124 A1* | 6/2015 | Tsuji | H04L 47/20 370/230 |

OTHER PUBLICATIONS

Scott Smith, "System x Private Cloud Offering: Architecture and Implementation Guide," May 13, 2011.

* cited by examiner

*Primary Examiner* — Derrick Ferris
*Assistant Examiner* — Jay Vogel
(74) *Attorney, Agent, or Firm* — Katherine Brown; Andrew M. Calderon; Roberts Mlotkowski Safran & Cole, P.C.

(57) ABSTRACT

A data handling system network includes a data handling system that is communicatively coupled to a switch by a network. The data handling system includes one or more logical partitions. Each logical partition includes a plurality of virtual switches and a plurality of virtual network interface cards. Each virtual network interface card is associated with a particular virtual switch and includes a plurality of QoS queues. The switch includes one or more switch partitions. Each switch partition includes a plurality of QoS queues that are associated with the QoS queues of the virtual network interface card. A packet is received with the virtual switch and the virtual switch sets and associates a QoS priority flag with the received packet. The virtual switch forwards the packet to a QoS queue comprised within the virtual network interface card based upon the QoS priority flag.

19 Claims, 5 Drawing Sheets

QUALITY OF SERVICE IN MULTI-TENANT NETWORK

FIELD

Embodiments of invention generally relate to a data handling network, and more specifically relate to quality of service (QoS) in a multi-tenant data handling network.

BACKGROUND

A data handling network is a type of communications network that allows computers or other data handling systems to exchange data. These computers or data handling devices pass data to each other along data connections. The connections are established using either cable media or wireless media.

Virtualization, in data handling environments, refers to the creation of a virtual, as opposed to a physical, version of a physical resources within a data handling system. Typical physical resources that may be virtualized are processors, memory, etc.

With ever increasing complexity and number of virtual devices within a data handling system, it is increasingly complex to manage the exchange of data within a network that includes multiple data handling devices and a plethora virtual devices.

SUMMARY

In a particular embodiment of the present invention, a data handling system network includes a data handling system is communicatively coupled to a switch by a network. The data handling system includes one or more logical partitions. Each logical partition may include a plurality of virtual switches and a plurality of virtual network interface cards. Each virtual network interface card is associated with a particular virtual switch and includes a plurality of QoS queues. The switch includes one or more switch partitions. Each switch partition includes a plurality of QoS queues that are associated with the QoS queues of the virtual network interface card.

In another embodiment of the present invention, a packet routing method includes receiving a packet with a virtual switch, setting with the virtual switch a QoS priority flag, associating with the virtual switch the QoS priority flag with the received packet, and transmitting the packet with the virtual switch to a QoS queue comprised within a virtual network interface card based upon the QoS priority flag.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
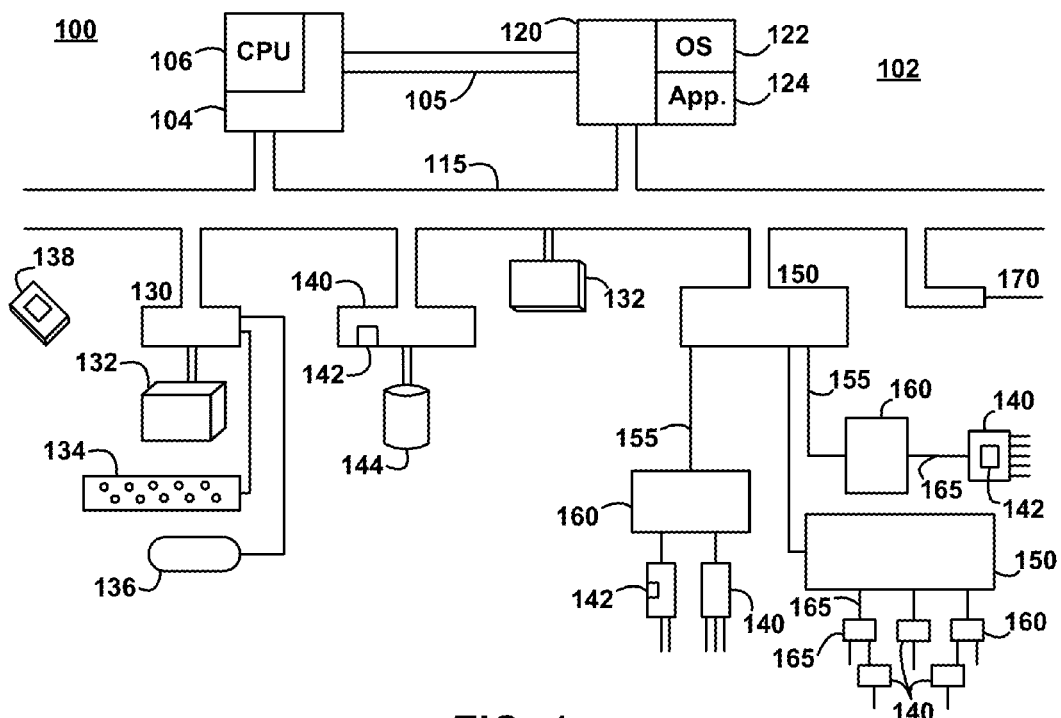
FIG. 1 depicts an exemplary data handling system within a data handling network, in accordance with various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts an exemplary data handling system within a data handling network, in accordance with various embodiments of the present invention. More specifically, FIG. 1 illustrates components and an interconnection topology for an information handling system, for example a computer system 100 that may utilize, carry out, etc. one or more embodiments the present invention. Computer system 100 may comprise a host 102 having a processor 104 connected to a memory 120 by an internal bus 105 and/or a host system bus 115. The processor 104 has at least one general-purpose programmable processor unit (CPU) 106 that may execute program instructions stored in main memory 120. Although a single CPU 106 is shown in FIG. 1, it should be understood that a processor 104 may have multiple CPUs 106.

Memory 120 or a portion of memory 120 may be physically included within the processor 104 or connected to it via an internal bus system 105 or via a host system bus 115. Memory 120 may be for example a random access semiconductor memory for storing data and/or program instructions. Though memory 120 is shown conceptually as a single monolithic entity, memory 120 may be arranged as a hierarchy of caches and other memory devices. In some instances, a hierarchy of cache memories is associated with each CPU 106. Memory 120 includes operating system (OS) 122 and applications 124. Operating system 122 may provide functions such as device drivers or interfaces, management of memory pages, management of multiple tasks, etc., as is known in the art. Applications 124 may for example include a server software application whereby a network interface 170 may interact with the server software application to enable computer system 100 to be a network server.

Host system bus 115 may support the transfer of data, commands, and other information between the host 102 and peripheral or external devices attached to it, and communication of data which may occur between the external devices independent of the host 102. While shown in simplified form as a single bus, the host system bus 115 may be structured as multiple buses which may be for example hierarchically arranged. Host system bus 115 may be connected to other internal host 102 components (such as a touch screen, display 132, touch pad, etc.) and/or to a myriad of external or peripheral devices through a connection hub 130, through an adapter 140, a multifunction adapter 150, or directly to a network 170.

These peripheral devices may include a monitor or display 132, a keyboard 134, a mouse or other handheld device 136, and/or a printer 138. Display 132 may be a cathode-ray tube display, a flat panel display, or a touch screen, or other display technology. One or more adapters 140 may support keyboard 134 and mouse 136; it being understood that other forms of input devices could be used. The number and types of devices shown in FIG. 1 are illustrative only and ordinary users of computer systems now know that a great variety of connected devices exist; e.g., microphones, speakers, infrared remote controls, wireless connected devices, etc. and therefore computer system 100 is not limited to those devices illustrated in FIG. 1.

The host system bus 115 may also be connected to an adapter 140 (e.g. an I/O adapter connected to an external memory device 144). External memory device 144 may be rotating magnetic disk storage, rotating or static optical drives, magnetic tape storage, FLASH memory, etc. Adapter 140 may include adapter microcode or firmware and decision logic which may be embodied as a message processor 142. The adapter 140 may also be provided with at least one fast nonvolatile write cache, queues, interrupt registers connected to the message processor 142 and/or decision logic. The message processor 142 may process incoming messages from the host processor complex 102 and generate and transmit response messages back to the host processor complex 102.

An adapter 140 may contain electronic components and logic to adapt or convert data of one protocol on one bus to another protocol on another bus. Therefore, adapters 140 may connect a wide variety of devices to the host computer system 102 and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

The host system bus 115 may also be connected to a multifunction adapter 150 to which more I/O devices may be connected either directly, or through one or more bridge devices 160, or through another multifunction adapter 150 on either a primary bus 155 or a secondary bus 165. Various components may be connected to the primary bus 155 including, for example, an adapter 140, a bridge device 160, or another multifunction 1/0 processor or a multifunction adapter 150. The bridge device 160 bridges the primary bus 155 and a secondary bus 165 to which various adapters 140 may be connected. The adapters 140, the primary bus 155, and the secondary bus 165 may conform to the PCl/PCI-X or other industry bus specification. One skilled in the art realizes, however, that the implementation is not limited to a PCl/PCI-X or a SCSI or USB bus implementation but is applicable to any electrical, optical, or wireless bus where data must be efficiently transferred.

Network interface 170 provides an operative connection for transmission of data to and from a network. The network may be an internet but could also be any smaller self-contained network such as an intranet, a WAN, a LAN, or other internal or external network using; e.g., telephone transmission lines, cable services, satellites, fiber optics, T1 lines, wireless, etc., and any other various technologies.

Finally, computer system 100 need not be a computer at all, but may be a simpler appliance-like client device with less memory such as a network terminal, a thin client, a terminal-like device, a voice response unit, etc. The convergence of computing, telecommunications and consumer electronics is causing a tremendous growth in the number and variety of pervasive mobile devices as clients. This mobile architecture enables the multitude of clients including laptops, sub-notebooks, handheld computers such as personal digital assistants and companion devices, and mobile appliances such as smartphones, pages, simple messaging devices and wearable devices. Thus when the computer system 100 is a mobile device, the adapters 140 and network interfaces 170 support a variety of multi-modal interfaces including traditional keyboard and mouse interfaces, small text screens, pen, touch screens, speech recognition, text-to-speech, and/or wearable devices.

The computer system shown in FIG. 1 is intended to be a simplified representation, it being understood that many variations in system configuration are possible in addition to those specifically mentioned here. While computer system 100 could conceivably be a personal computer system, the computer system 100 may also be a larger computer system such as a general purpose server. Computer system 100 and its components are shown and described in FIG. 1 above as a more or less single, self-contained computer system. It is alternatively possible to use multiple modular computer systems that may share a single large database, etc.

Various embodiments of the present invention pertain to methods that may be implemented upon or by computer system 100. When computer system 100 performs particular as directed from the program instructions stored in memory 120, such data handling system 100 in effect becomes a special purpose machine particular to the various methods as described further herein.

Figure 2:
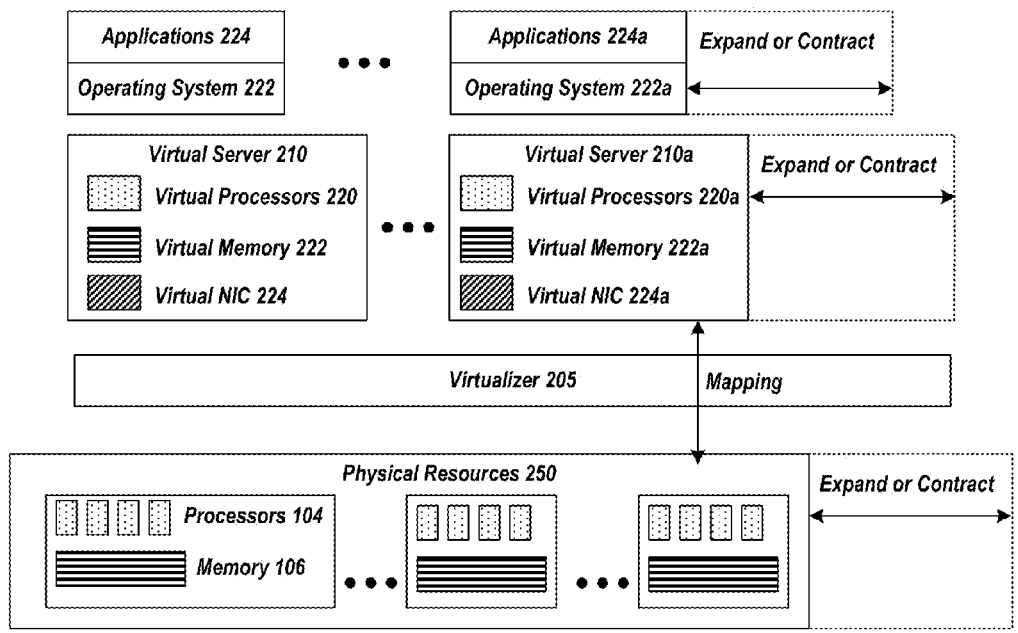
FIG. 2 depicts an exemplary data handling system that includes virtual components, in accordance with various embodiments of the present invention.

FIG. 2 depicts an exemplary block diagram of a data handling system 200 that includes virtual components, in accordance with various embodiments of the present invention. In certain implementations, data handling system 200 may be a server computer that includes multiple virtual components. Data handling system 200 includes one or more physical hardware resources 250 that can be mapped, virtualized, etc. to one or more virtual servers 210. Exemplary physical resources 250 may include physical hardware devices such as those of data handling system 100, such as processor 104, memory 106, I/O adapters 108, network interface 170 card, etc. These physical resources 250 may be implemented, managed, etc. by virtualizer 205 as described by a management consol 289 after it receives configuration information (e.g. an administrator or user may indicate a virtualization arrangement utilizing management consol 289 that is communicated to and carried out by virtualizer 205, etc.).

A virtual server 210 may be a proxy for a physical server that has the same capabilities, interfaces, state, etc. Virtual servers 210 are created and managed by virtualizer 205 that may reside on, e.g. a physical data handling system 100, etc. A virtual server 210 appears to be a physical server to its user: operating system 122, middleware, application software 124, etc. associated therewith. Data handling system 200 may include one or more virtual servers such as virtual server 210a, 210b, 210c, etc.

Each virtual server 210 appears to its software to include its own processor(s), memory, and 1/0 adapter(s), network interface card(s) that are available for the exclusive use of that virtual server 210. For example, virtual server 210a includes a virtual processor 220a, virtual memory 222a, and virtual network interface card 224a.

Each virtual server 210 may supports its own software environment, including an operating system 122, middleware, applications 124, etc. The software environment of each virtual server 210 can be different from the software environment of other virtual servers 210. For example, the operating systems 122 executed by each virtual server 210 may differ from one another. For example, virtual server 210a supports operating system 122a and applications 124a.

A virtual server 210 may be a logical description of a server that defines a server environment that acts, to a user, as if it were a physical server, being accessed and providing information in the same way as a physical server. The virtual processors 220, virtual memory 222, virtual I/O adapters, and/or virtual network interface cards 224 that are defined for each virtual server 210 are logical, virtualized, etc. devices emulating e.g. physical processors 104, memory 106, I/O adapters 140, and/or network interface 170 card, etc.

Virtualizer 205 manages the mapping between the virtual servers 210 with their virtual processors 220, virtual memory 222, virtual I/0 adapters 140, network interface 170 cards and other physical resources 250 that are selected to implement the associated virtual devices. For example, when a virtual processor 220 is dispatched, a physical processor 104 is selected by virtualizer 205 to be used to execute and implement that virtual processor 220. Virtualizer 205 manages the selections of physical resources 250 and their temporary assignment to the associated virtual devices.

Virtualizer 205 is responsible for dynamically creating and managing virtual servers 210. Whole virtual processors 220, virtual I/0 adapters, and virtual memory 222, etc. can be removed or added by virtualizer 205. Virtualizer 205 is also responsible for dynamic resource allocation, managing time-sharing of physical resources 250, and altering the virtual resources mapped to associated physical resources 250 without involving the operating system 122. Virtualizer 205 is also able to dedicate physical resources 250 to virtual resources for situations where sharing is not desired. Virtualizer 205 is responsible for managing the addition or removal of physical resources 250. Virtualizer 205 may make these additions and deletions transparent to the upper level application 124. In certain embodiments, virtualizer 205 may be a hypervisor, managing logical partition, etc.

In certain embodiments, an adapter 140, etc. within data handling system 100 may be configured as is known in the art (e.g. Data Center Bridging Capabilities Exchange Protocol (DCBX), etc.). Virtualizer 205 may in turn implement the configuration upon the associated virtual device. For example, virtualizer 205 may implement the DCBX configuration of the physical adapter 140 upon a virtual network interface card 300.

Figure 3:
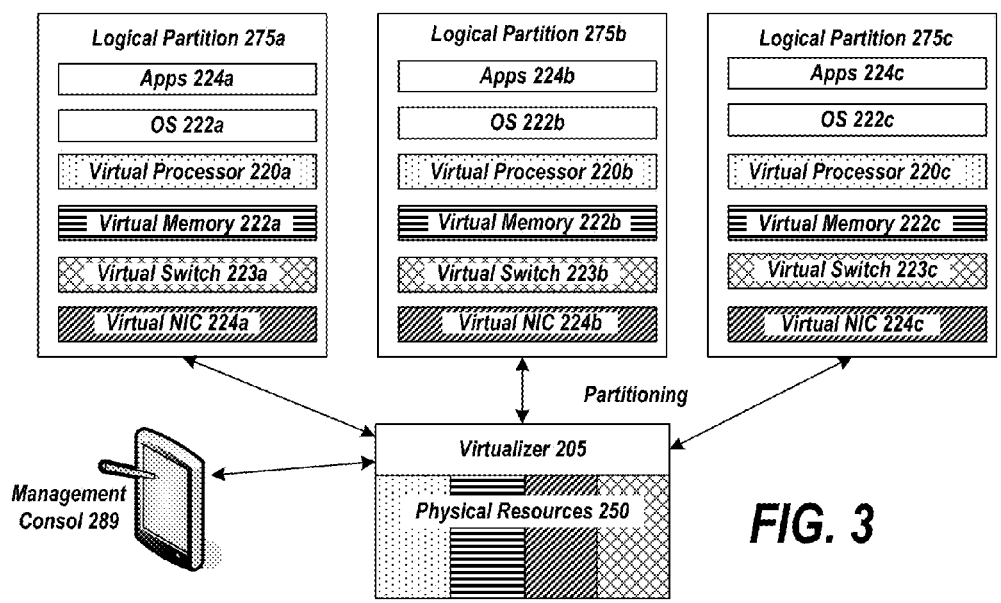
FIG. 3 depicts an exemplary data handling system that includes a plurality of logical partitions, in accordance with various embodiments of the present invention.

FIG. 3 depicts data handling system 200 that includes a plurality of logical partitions 275, in accordance with various embodiments of the present invention. Virtualizer 205 may service one or more logical partitions 275 during a dispatch time slice. The dispatch time slice is a particular length of time. During each dispatch time slice, virtualizer 205 will allocate, map, or assign, physical resources 250 to each logical partition 275. When the logical partition 275 has been allocated time on the physical resources 250, the virtual devices defined by that logical partition 275 will be executed by the associated physical resources 250. For example, a particular logical partition 275a will define virtual devices, such as, virtual processor 220a, virtual memory 222a, virtual switch 223a, and virtual network interface card 224a and may implement operating software 122a and one or more application software 124a, etc. Management consol 289 such as a managing server, computer, hand held device, etc. may be utilized to allow a user, or data handling system 200 administrator, to manage or direct the number of partitions 275, the virtual devices that are defined by that logical partition 275, the dispatch time slice duration, etc. In certain embodiments a single logical partition 275 may include a single virtual server 210.

Distinct partitions (e.g. logical partition 275a, 275b, etc.) may share physical resources 250. For example, logical partition 275a and 275b may access memory from a common memory chip 106, provided that the ranges of addresses directly accessible to each partition 275 do not overlap. In another example, a processor 104 may be dedicated to a single logical partition 275c or shared amongst logical partitions e.g. 275a, 275b, 275c.

Figure 4:
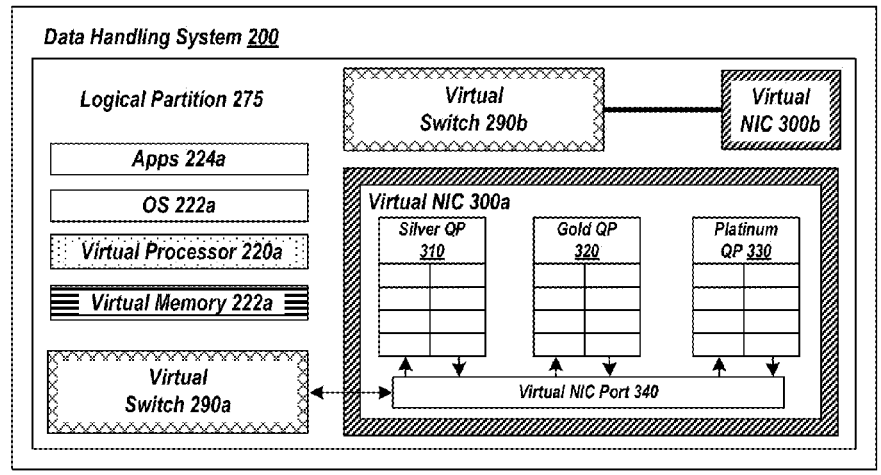
FIG. 4 depicts an exemplary data handling system that includes an exemplary logical partition that includes various virtual components, in accordance with various embodiments of the present invention.

FIG. 4 depicts data handling system 200 that includes an exemplary logical partition 275 that includes various virtual components, in accordance with various embodiments of the present invention. In accordance with the various embodiments herein, a logical partition 275 may include multiple tenants. In the context of this document, a tenant is synonymous with a virtual switch 290. Therefore, the term multiple tenants is synonymous with multiple virtual switches 290.

A logical partition 275 may include multiple virtual switches 290a, 290b, etc. emulated by virtualizer 205 from hardware resources 250. A virtual switch 290 is a virtualized network switch or switching hub that links network segments or network devices emulated by virtualizer 205 from hardware resources 250 of data handling system 200. In certain embodiments, a virtual switch 290 may receive a packet from a network node or switch and transmit a packet to a network node or switch.

To achieve QoS in a multi-tenant network, virtual switch 290 implements, adds, or otherwise associates a QoS priority flag to incoming packets prior to transmitting the packet. In certain embodiments, the QoS priority flag may be 802.1p priority field in the packet. The 802.1p priority may correspond to various QoS priority levels. For example, a value may correspond to a lowest QoS priority level (e.g. a silver priority, etc.), a second value may correspond to a middle QoS priority level (e.g. a gold priority, etc.), and a third value may correspond to a highest QoS priority level (e.g. a platinum priority, etc.). Though three QoS priority levels are described, more or less QoS priority levels may be implemented. In certain embodiments, other existing fields with packets may be utilized to indicate a QoS priority or new fields may be added to packets (e.g. a two byte priority indicator may be added, etc.) to specify QoS priorities.

In certain embodiments, each virtual switch 290 is associated with its own virtual network interface card 300 within logical partition 275. The virtual network interface card 300 is a virtualized network interface card that provides a network interface and is emulated by virtualizer 205 from physical resources 250 of data handling system 200. For example, virtual network interface card 300 is an emulated adapter 140, etc. Virtualizer 205 may implement a virtual configuration upon virtual network interface card 300 that corresponds to a physical configuration of adapter 140, network interface card, etc.

In certain embodiments, virtual network interface card 300 may include a virtual NIC port 340, a silver queue 310, a gold queue 320, and/or a platinum queue 330. In certain embodiments, in addition to virtual NIC port 340, virtual NIC 300 may also include other virtualized components such as virtual memory, virtual processor, etc. that emulate physical resources of a physical network interface card, adapter 140, etc.

To implement QoS in a multi-tenant network, in certain embodiments, subsequent to implementing, adding, or otherwise associating the priority flag to the packet, virtual switch 290 may transmit the packet to virtual network interface card 300. For example, when virtual switch 290 adds a platinum flag to the received packet it may subsequently transmit the packet to the platinum queue 330. Likewise, when virtual switch 290 adds a gold flag to a received packet it forwards the packet to gold queue 320. Further, when virtual switch 290 adds a silver flag to the received packet it forwards the packet to silver queue 310.

In certain embodiments, silver queue 310, gold queue 320, and platinum queue 330 may be queue pairs where one respective queue is utilized for ingress packets and a corresponding associated queue is utilized for egress packets. In certain embodiments, the relative sizes of the queues may differ and/or may change according to network bandwidth, routing policies, administrator configuration, dynamic active loading, etc. For instance, the platinum queue 330 may expand to accommodate a burst of highest QoS priority level packets.

In certain embodiments, logical partition 275 may include additional virtual switches and associated virtual NICs associated with a different traffic class than the data packet traffic class associated with virtual switch 290, virtual NIC 300, etc. For example, additional virtual switches and associated virtual NIC (not shown) may be associated with, for example, fiber channel over Ethernet (FCoE) packets.

Figure 5:
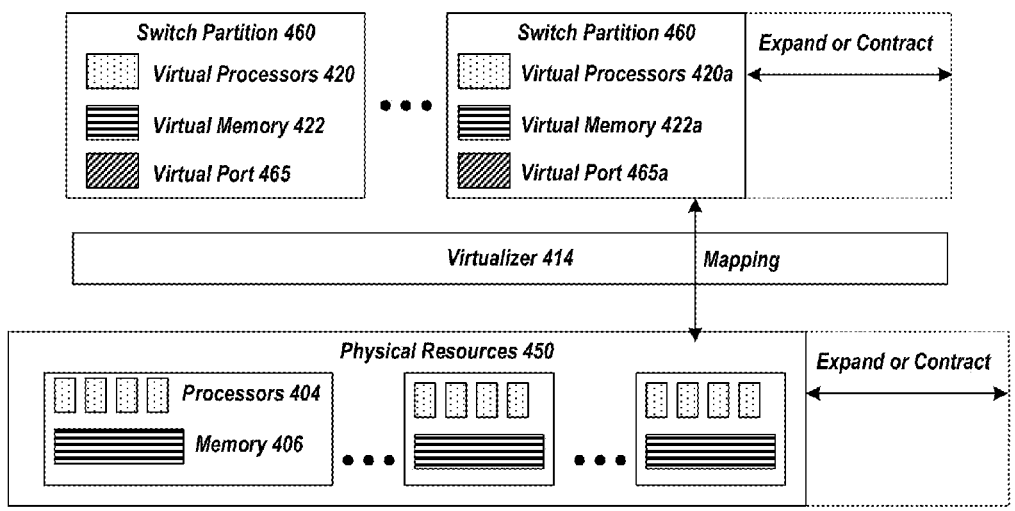
FIG. 5 depicts an exemplary network switch system that includes virtual components, in accordance with various embodiments of the present invention.

FIG. 5 depicts an exemplary switch system 410 that includes virtual components, in accordance with various embodiments of the present invention. Switch system 410 is a physical network switch or switching hub that links network segments or network devices and includes physical hardware resources 450 that can be mapped to one or more switch partitions 460. Switches partitions 460 are created and managed by virtualizer 414 that resides on physical switch system 410.

In certain embodiments, a switch partition 460 may include virtual processor(s), memory, data ports, etc. emulated from physical resources 450 that are available for the exclusive use of that particular switch partition 460. For example, a particular switch partition may include a virtual processor 420a, virtual memory 422a, virtual port 465, etc.

Each switch partition 460 may supports its own switching environment, including switch protocols, routing logic, etc. The switching environment of each switch partition 460 can be different from the switching environment of other switch partitions 460.

A switch partition 460 may be a logical description of physical switch system 410 that defines a networking environment that acts, to a user, as if it were a physical switch, being accessed and routing data in the same way as physical switch system 410. The virtual processors 320, virtual memory 322, etc. that are defined for each switch partition 460 are logical substitutes for physical processors, memory, ports, etc. of physical switch system 410.

Figure 6:
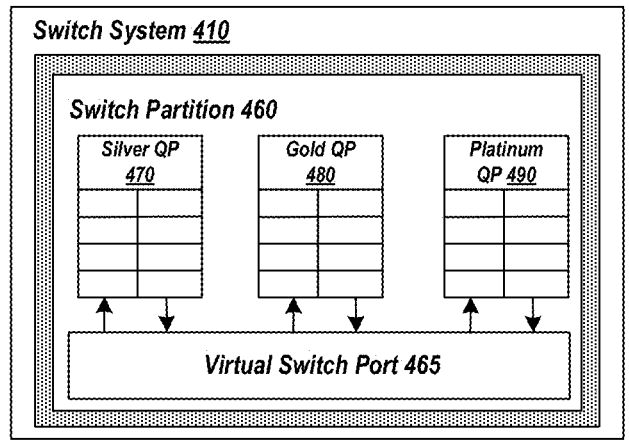
FIG. 6 depicts an exemplary network switch system that includes a switch partition, in accordance with various embodiments of the present invention.

FIG. 6 depicts an exemplary network switch system 410 that includes a switch partition 460, in accordance with various embodiments of the present invention. In certain embodiments, a switch partition 460 may include a virtual switch port 465, a silver queue 470, a gold queue 480, and/or a platinum queue 490. In certain embodiments, the switch partition 460 may include fewer or greater QoS queues than those depicted in FIG. 6. In certain embodiments, a switch partition 460 includes a similar number of QoS queues as the number of QoS queues within a virtual NIC 300. To maintain QoS in a multi-tenant network, in certain embodiments, data packets may be transmitted from virtual NIC 300 to switch partition 460 and data packets may be transmitted from switch partition 460 to virtual NIC 300.

In certain embodiments, silver queue 470, gold queue 480, and platinum queue 490 may be queue pairs where one respective queue is utilized for ingress packets and a corresponding associated queue is utilized for egress packets. In certain embodiments, the relative sizes of the queues may differ and/or may change according to network bandwidth, routing policies, administrator configuration, dynamic active loading, etc. For instance, platinum queue 490 may expand to accommodate a burst of highest QoS priority level data packets. In certain embodiments, associated QoS queues (i.e. platinum queues 310, 490, etc.) expand or contract as group. In other embodiments, associated QoS queues may expand or contract without regard to the relative size of the associated queue within a downstream/upstream network system.

Figure 7:
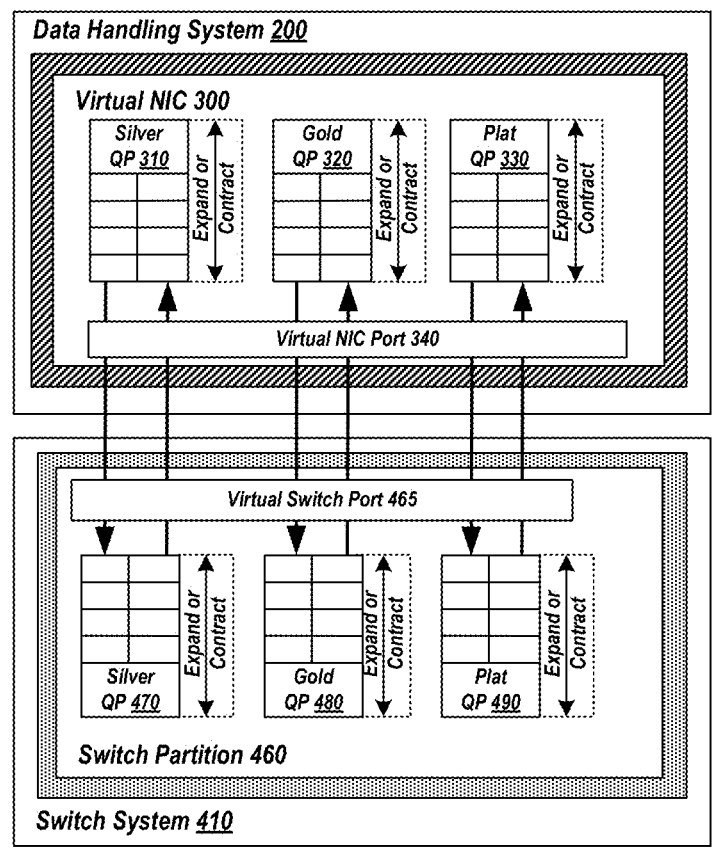
FIG. 7 depicts a data handling network topology to exchange data between a virtual network interface card within a logical partition and a switch partition, in accordance with various embodiments of the present invention.

FIG. 7 depicts a data handling network topology to exchange data between a virtual NIC 300 within a logical partition 275 and a switch partition 460, in accordance with various embodiments of the present invention. In certain embodiments data packets are transmitted to and from associated queues within a virtual NIC 300 and a switch partition 460 that correspond to similar QoS priorities. For example, when a data packet includes a platinum flag and is within platinum queue 330, it may be transmitted to platinum queue 490 in switch partition 460. Likewise, when a packet includes a gold flag and is within gold queue 320, it may be transmitted to gold queue 480 in switch partition 460. Further, when a packet includes a silver flag and is within silver queue 310, it may be transmitted to silver queue 470 in switch partition 460.

Figure 8:
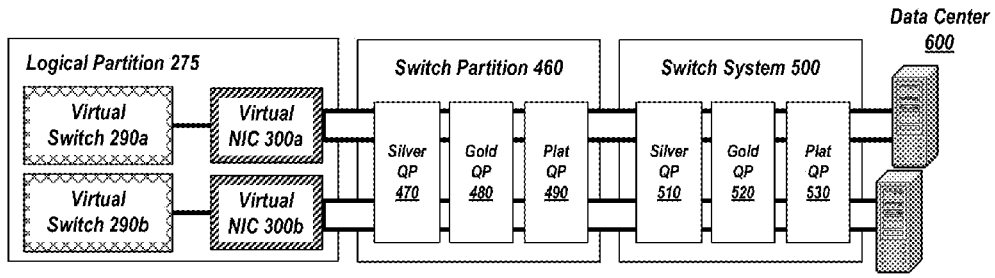
FIG. 8 and FIG. 9 depict exemplary data handling network topology for the exchange of data, in accordance with various embodiments of the present invention.
Figure 9:
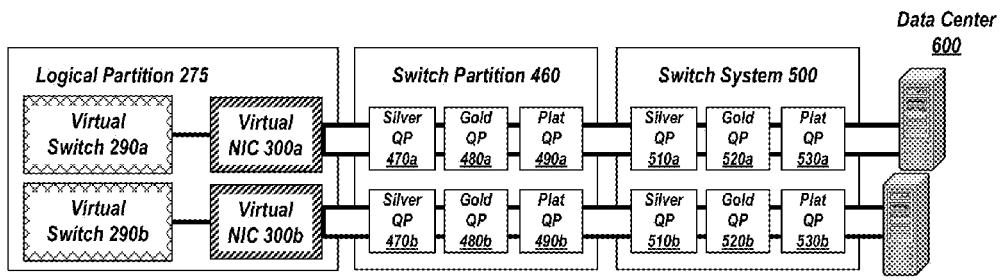

FIG. 8 and FIG. 9 depict exemplary data handling network topologies for the exchange of data, in accordance with various embodiments of the present invention. In certain embodiments, a network topology may include additional switch systems 500 and other network devices, such as data center 600. Switch system 500 may include similar components to switch system 400. Thus, switch system 500 may include a silver queue 510, a gold queue 520, and/or a platinum queue 530. To maintain QoS in a multi-tenant network, switch system 400 may transmit data packets to/from switch system 500 according to the packet's priority flag. In certain embodiments, data packets are transmitted to/from associated queues within switch system 400 and switch system 500. For example, when a data packet includes a platinum flag and is within platinum queue 490, it may be transmitted to platinum queue 530. Likewise, when a packet includes a gold flag and is within gold queue 480, it may be transmitted to gold queue 520. Further, when a packet includes a silver flag and is within silver queue 470, it may be transmitted to silver queue 510.

In certain embodiments, the QoS in a multi-tenant network may be maintained throughout the entire packet routing path by transmitting packets from a virtual switch 290 to data center 600 according to the QoS priority flag associated therewith.

In particular embodiments, it is advantageous that a single virtual network interface card 300 be associated with its own platinum queue 330, 490, 530, etc., gold queue 320, 480, 520, etc., silver queue 310, 470, 510, etc. as shown in FIG. 9, as opposed to multiple virtual NICs 300 being associated with similar platinum queues 330, 490, 530, etc., gold queues 320, 480, 520, etc., silver queues 310, 470, 510, etc. as shown in FIG. 8. If multiple virtual switches 290 are utilizing a single platinum queue 330, gold queue 320, silver queue 310, etc. a particular virtual switch 290a may starve the other virtual switch 290b of queue resources. For example, if virtual switch 290a is transmitting platinum priority packets to platinum queue 330 that is shared by virtual switch 290b, virtual switch 290a may utilize the entire or majority of platinum queue 330 thus leaving no or inadequate queue 330 resource available to virtual switch 290b.

Figure 10:
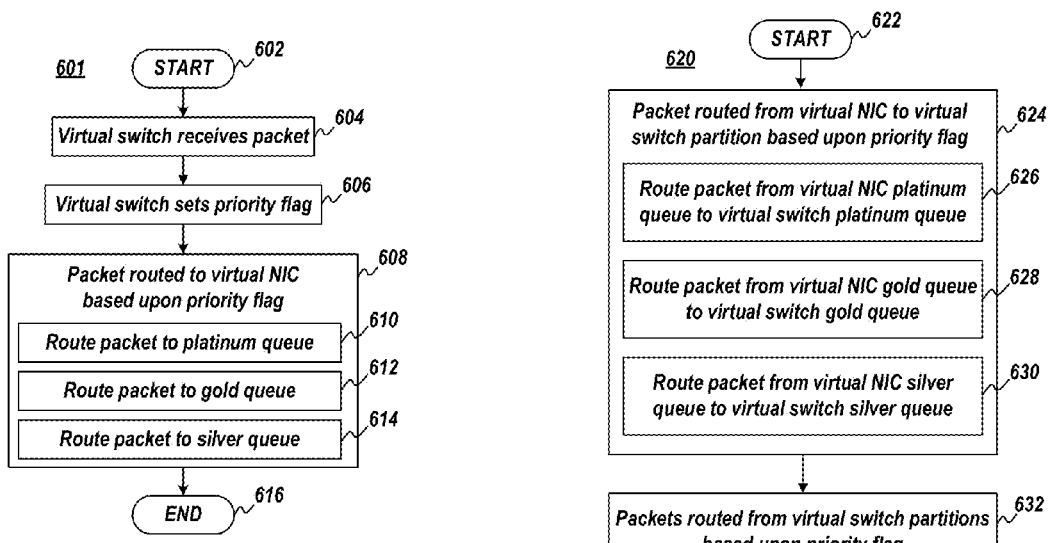
FIG. 10 depicts a block diagram of a method for setting a packet QoS flag and routing the packet within a data handling network based upon the priority flag, according to various embodiments of the present invention.

FIG. 10 depicts a block diagram of a method 601 for setting a packet QoS flag and routing the packet within a data handling network based upon the priority flag, according to various embodiments of the present invention. Method 601 begins at block 602 and continues with virtual switch 290 receiving a data packet (block 604). To implement QoS in a multi-tenant network, virtual switch 290 sets a QoS priority flag (block 606). For example, virtual switch 290 may add a particular two bit combination to the packet to indicate that packet has a platinum QoS priority. In certain embodiments, virtual switch 290 may set a QoS priority flag by other methodologies.

Method 601 continues with virtual switch 290 transmitting the packet to a virtual network interface card 300 based upon the QoS priority flag (block 608). For example, virtual switch 290 may add a platinum QoS flag to a packet and transmit the packet to platinum queue 330 within virtual network interface card 300 (block 610). Virtual switch 290 may also add a gold QoS priority flag to a packet and transmit the packet to gold queue 320 within virtual network interface card 300 (block 612). Virtual switch 290 may also add a silver flag to a packet and subsequently forward the packet to silver queue 310 within virtual network interface card 300 (block 614). Method 601 ends at block 616.

Figure 11:
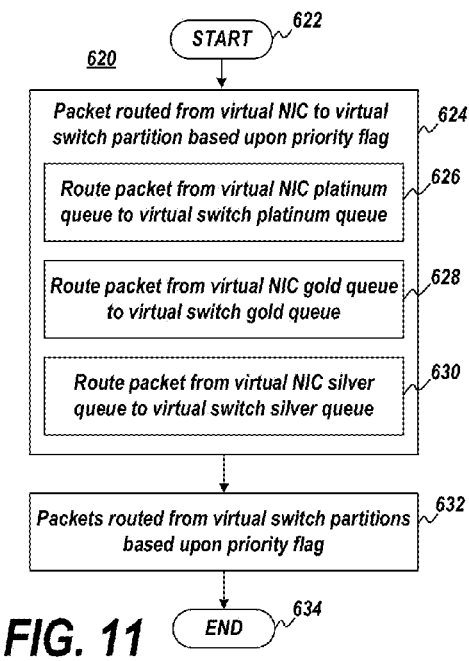
FIG. 11 depicts a block diagram of a method for routing a packet within a data handling network based upon a QoS priority flag, according to various embodiments of the present invention.

FIG. 11 depicts a block diagram of a method 620 for routing a packet within a data handling network based upon a QoS priority flag, according to various embodiments of the present invention. Method 620 begins at block 622 and continues with routing a packet having an associated QoS priority flag from virtual network interface card 300 to a switch partition 460 based upon the QoS priority flag (block 624). For example, virtual network interface card 300 may forward a packet that has a platinum QoS priority flag from platinum queue 330 to a platinum queue 490 within the switch partition 460 (block 626). In certain embodiments, the packet may be forward from virtual NIC port 340 to a virtual switch port 465. For example, the virtual switch port 465 may query the packet's QoS priority flag, determine that the QoS priority flag is a platinum flag, and forward the packet to platinum queue 490.

Virtual network interface card 300 may forward a packet that has a gold QoS priority flag from gold queue 320 to a gold queue 480 within the switch partition 400 (block 628). In certain embodiments, the virtual switch port 465 may query the packet's QoS priority flag, determine that the QoS priority flag is a gold flag, and forward the packet to gold queue 480. Similarly, virtual network interface card 300 may forward a packet that has a silver QoS priority flag from silver queue 310 to a silver queue 470 within the switch partition 460 (block 630). In certain embodiments, the virtual switch port 465 may query the packet's QoS priority flag, determine that the QoS priority flag is a silver flag, and forward the packet to silver queue 470.

Method 620 may continue with transmitting packets from switch partition 400 based upon the packets' QoS priority flag (block 632). For example, virtual switch port 465 may transmit a packet that has a platinum QoS priority flag from platinum queue 490 to a platinum queue 530 within a partition of switch system 500, or data center 600, virtual switch port 465 may transmit a packet that has a gold QoS priority flag from gold queue 480 to a gold queue 520 within a partition of switch system 500, or data center 600, and/or virtual switch port 465 may transmit a packet that has a silver QoS priority flag from silver queue 470 to a silver queue 510 within a partition of switch system 500, or data center 600. Method 620 ends at block 634.

For clarity, though three QoS priority levels and associated QoS priory queues are described throughout, more or less QoS priority levels and associated QoS priory queues may be utilized. For example, there may be eight QoS priority levels and associated QoS priority queues. In certain embodiments, the number of QoS priority levels and associated QoS priory queues is determined by the consideration of variables such as packet priority, packet transmission speed, network latency, security, encryption, etc.

The drawings are not necessarily to scale. The drawings are merely schematic representations, not intended to portray specific parameters of the invention. The drawings are intended to depict only exemplary embodiments of the invention. In the drawings, like numbering represents like elements.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A data handling system network comprising:
a data handling system communicatively coupled to a switch by a network, the data handling system comprising:
one or more logical partitions, each logical partition comprising a plurality of virtual switches, and;
a plurality of virtual network interface cards, each network interface card associated with a virtual switch, the virtual network interface card comprising a plurality of quality of service (QoS) queues;
wherein the switch comprises one or more switch partitions, each switch partition comprising a plurality of QoS queues associated with the plurality of virtual network interface card QoS queues such that each virtual network interface card QoS queue has a corresponding switch partition QoS queue of a same priority level,
wherein each of the plurality of QoS queues of each virtual network interface card and each corresponding switch partition comprises a queue pair having an ingress queue for ingress packets and an egress queue for egress packets, and
wherein, for each of the plurality of QoS queues of each virtual network interface card, the egress queue is connected to an ingress queue of the corresponding switch partition QoS queue of the same priority level, and the ingress queue is connected to the egress queue of the corresponding switch partition QoS queue of the same priority level.

2. The data handling system network of claim 1 wherein the virtual switch and the virtual network interface card are emulated by a virtualizer utilizing physical resources comprised within the data handling system.

3. The data handling system network of claim 2 wherein the virtualizer is comprised within the data handling system.

4. The data handling system network of claim 1 wherein the switch partitions are created by a virtualizer utilizing physical resources comprised within the switch.

5. The data handling system network of claim 1 wherein each virtual switch sets a QoS priority flag and associates the QoS priority flag with one or more packets and wherein the virtual switch transmits the packet to a particular virtual network interface card QoS queue based upon the QoS priority flag.

6. The data handling system network of claim 5 wherein the virtual network interface card transmits the packet to a particular switch partition QoS queue based upon the QoS priority flag.

7. The data handling system network of claim 5 wherein the virtual network interface card transmits the received packet to a virtual port within the switch partition, and wherein the virtual port determines the received packet's QoS priority flag and forwards the packet to the particular switch partition QoS queue associated with the received packet's QoS priority flag.

8. The data handling system network of claim 5 wherein the QoS priority flag is an 802.1p priority field within each of the one or more packets.

9. The data handling system of claim 5 wherein an individual virtual switch is associated with an individual network interface card to prevent multiple virtual switch starvation of the virtual network interface card QoS queues.

10. The data handling system of claim 1 wherein an individual virtual switch is associated with an individual network interface card to prevent multiple virtual switch starvation of the virtual network interface card QoS queues.

11. The data handling system network of claim 1 wherein each virtual network interface card comprises a first QoS priority queue associated with a highest QoS priority, a second QoS priority queue associated with a next highest QoS priority, and a nth QoS priority queue associated with a lowest QoS priority.

12. A packet routing method comprising:
receiving a packet with a virtual switch within a logical partition of a data handling system;
setting, with the virtual switch, a quality of service (QoS) priority flag and associating the QoS priority flag with the received packet;
transmitting, with the virtual switch, the packet to a QoS queue comprised within a virtual network interface card within the logical partition of the data handling system based upon the QoS priority flag; and
forwarding, with the virtual network interface card, the received packet to one of a plurality of switch partition QoS queues based upon the QoS priority flag, wherein each of the virtual network interface card QoS queues has a corresponding switch partition QoS queue of a same priority level,
wherein each of the plurality of QoS queues of each virtual network interface card and each corresponding switch partition comprises a queue pair having an ingress queue for ingress packets and an egress queue for egress packets, and
wherein, for each of the plurality of QoS queues of each virtual network interface card, the egress queue is connected to an ingress queue of the corresponding switch partition QoS queue of the same priority level, and the ingress queue is connected to the egress queue of the corresponding switch partition QoS queue of the same priority level.

13. The packet routing method of claim 12 wherein the virtual switch and the virtual network interface card are emulated by a virtualizer utilizing physical resources comprised within the data handling system.

14. The packet routing method of claim 13 wherein the virtualizer is comprised within the data handling system.

15. The packet routing method of claim 12 wherein the switch partition is created by a virtualizer utilizing physical resources comprised within a switch communicatively coupled to the data handling system by a network.

16. The packet routing method of claim 15 wherein the virtualizer is comprised within the switch.

17. The packet routing method of claim 13 further comprising:
transmitting, with the virtual network interface card, the received packet to a virtual port comprised within the virtual switch partition;
determining, with the virtual port, the received packet's QoS priority flag, and;
forwarding, with the virtual port, the packet to a particular switch partition QoS queue associated with the received packet's QoS priority flag.

18. The packet routing method of claim 12 wherein each virtual network interface card comprises a first QoS priority queue associated with a highest QoS priority, a second QoS priority queue associated with a next highest QoS priority, and a nth QoS priority queue associated with a lowest QoS priority.

19. The packet routing method of claim 12 wherein the QoS priority flag is an 802.1p priority field within the received packet.

* * * * *